Figure 11:
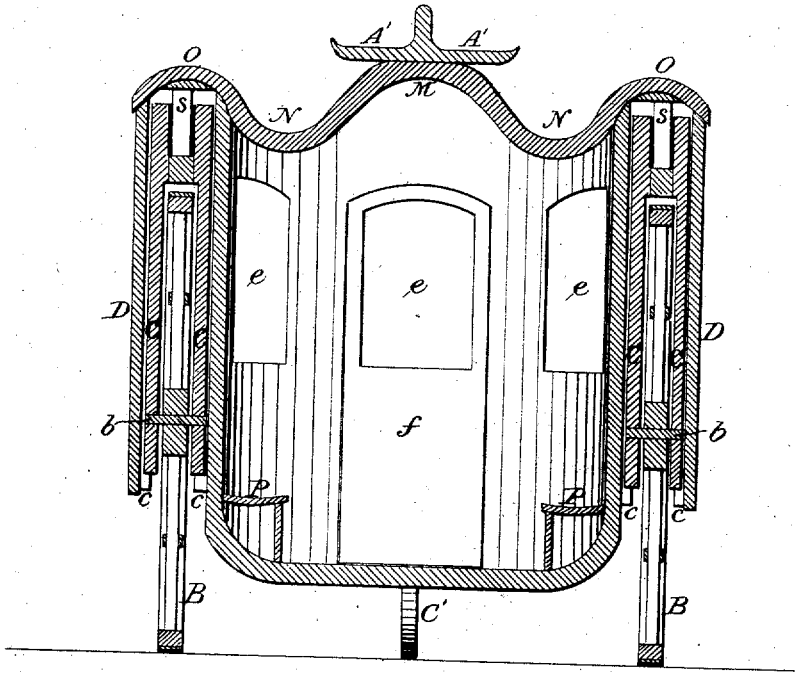

2 Sheets--Sheet 1.
M. V. NICHOLS.
Vehicles.
No. 6,120. Reissued Nov. 3, 1874.
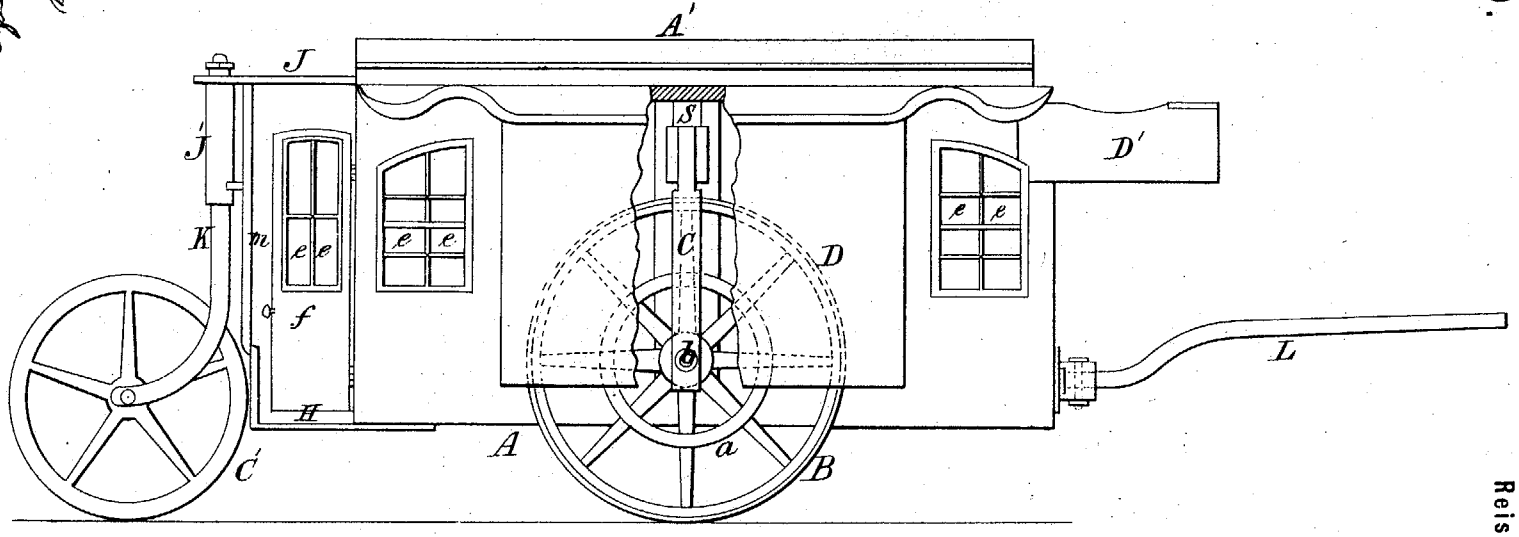
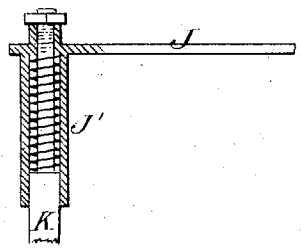
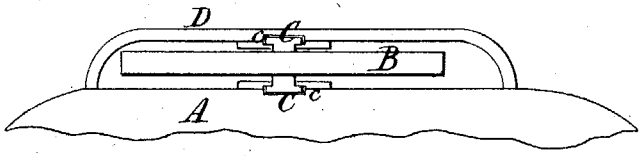
WITNESSES
John E. Laing
J. H. Rutherford
INVENTOR
Martin V. Nichols
by Johnson and Johnson
his Attorneys.
THE GRAPHIC CO. PHOTO-LITH. 39 & 41 PARK PLACE, N.Y.

2 Sheets--Sheet 2.

M. V. NICHOLS.
Vehicles.

No. 6,120.

Reissued Nov. 3, 1874.

WITNESSES

John E. Laing

J. A. Rutherford

INVENTOR

Martin V. Nichols

By Johnson and Johnson his Attorneys.

THE GRAPHIC CO. PHOTO-LITH. 39 & 41 PARK PLACE, N.Y.

UNITED STATES PATENT OFFICE.

MARTIN V. NICHOLS, OF OSAGE, IOWA.

IMPROVEMENT IN VEHICLES.

Specification forming part of Letters Patent No. 152,673, dated June 30, 1874; reissue No. 6,120, dated November 3, 1874; application filed October 20, 1874.

DIVISION B.

*To all whom it may concern:*

Be it known that I, MARTIN V. NICHOLS, of Osage, in the county of Mitchell and State of Iowa, have invented certain new and useful Improvements in Road Carriages or Omnibuses, of which the following is a specification:

In a patent granted to me November 11, 1873, I have described a road carriage or omnibus carried low down to the ground to afford easy ingress and egress for passengers, and the mounting of the carriage-body upon large wheels in such manner that the supporting-points for the body, while having independent bearings upon short wheel-axles, will be above the circumference of said wheels; the object being to obtain an easy-going omnibus similar in construction to a street-car.

The invention claimed herein is an improvement upon that patented to me as aforesaid; and it consists, first, in the combination, in a road carriage or omnibus supported upon side carrying-wheels at or near the middle of its length, of a stiff draft-tongue and a caster-wheel, supporting the rear end of said omnibus and controlled in its guiding action by said tongue, and the omnibus more readily and easily turned; second, in the combination, with the ingress and egress platform of an omnibus having large side carrying-wheels with short axles, of a caster-wheel of large diameter, located and arranged centrally to support the rear of the body without interference with the ingress and egress of the passengers at the sides of said platform; third, in the combination, in an omnibus, of the supporting side wheels mounted upon independently-acting frames provided with superposed springs, and inclosed in side housings at or near the middle of the length of the body, with a spring caster-wheel support located and arranged centrally at the rear of the platform, whereby the body is sustained and carried upon three large vertically-yielding wheels, one of which is the rear controlling-caster between the side ingress and egress platform steps; fourth, in the combination, with the top of the body, of the tubular guide-bearing for the caster-wheel, to afford a long and firm bearing to the caster-standard and a socket for its spring-seat.

In the accompanying drawings, Figure 1 represents a side elevation of a road carriage or omnibus embracing my invention; Fig. 2, a transverse section of the same; Fig. 3, a view of one of the side wheels and its frame secured within its housing; and Fig. 4, a detail view of the socket-bearing of the caster-wheel stem.

In Division A of this patent I have described certain combinations of vertical movable wheel-frames surmounted with spring-cushions, upon which the top of the body rests directly in the line of the axes of the carrying-wheels, and in which the front of the body is supported by a swiveling wheel with a straight standard, partially in advance of the load, and carried by a loose tongue between the horses, in front of their hips.

My present invention relates to certain new combinations arising from the employment of a stiff draft-tongue and a rear caster-wheel with a carriage-body carried low to the ground upon large wheels. It is only deemed necessary, therefore, in this patent, to describe only so much of the omnibus as will illustrate the application of my present invention.

The body A of the omnibus is preferably constructed with rounded ends, which are provided with windows *e*, with the ingress and egress door *f* at the rear, and the platform H, supported by rods *m* to a horizontal bracket, J, extending from the top of the body. The top of the body is corrugated, and provided with double central seats A′ for the accommodation of outside passengers, and leaving interior headway and standing room on each side of the interior seats P, and, in this particular, affording convenience to persons entering and leaving. The omnibus is supported upon side wheels B B and a rear caster-wheel, C′, combined with a stiff draft-tongue, L, by which the caster-wheel is controlled. The wheels B B I construct about seven feet in diameter, and the caster-wheel about six feet, with the body carried low down thereon to obtain the advantage of an easily-rolling movement over the inequalities of the road. The journals *b* of these wheels coincide with each other and are made short, being mounted in the lower ends of the vertical movable frames C C, arranged transversely in wheel-housings D, and with their upper ends strongly connected together and provided with springs *s*, on which the body of the vehicle is suspended and allowed free vertical play, the springs forming seats upon which the top of the body rests by direct contact. The standards of these frames are interlocked within guideways in the walls of the housings, to keep the wheels securely in place. The frames C C move freely in the guideways and allow the body to play freely on the springs *s* as suspension-bearings, directly in line with the axes of the transporting-wheels. The driver's seat D′ extends out from the front of the body. To the rear end of the top bracket J a vertical tube, J′, is secured, which affords a long bearing for a forked stem, K, which is free to swivel in said tube, and carries at its lower curved end the caster-wheel C′ at the rear of the platform and centrally lengthwise of the body, so as to be out of the way of the side platform-steps, for the ingress and egress of the passengers to and from the omnibus. The stem K is secured in place by a nut at its upper end, and is cushioned within the tube by a spring, so that the body has free vertical play upon said caster-wheel stem, and can be turned freely thereon. The tongue L is secured rigidly to the front end of the body, and its combination with the side wheels located at or near the middle of the length of the body and the rear controlling caster-wheel allow the body to be easily and readily turned, as the caster-wheel instantly yields to any lateral movement of the tongue and carries the body in the direction desired. The platform and its supporting-frame, together with the caster-wheel, affords sufficient weight to give all necessary preponderance to the rear end of the omnibus, to prevent any frontward tipping. While the tongue is rigid from any lateral movement except with the body, it may have sufficient vertical play at its front end to relieve it from the vibrations of the body upon its three suspending spring-supports.

I claim—

1. The combination, in a road-carriage or omnibus supported at or near the middle of its length by side-wheels, of a stiff draft-tongue, L, and a caster-wheel, C′, supporting the rear end of said omnibus and controlled in its guiding action by said tongue, substantially as and for the purpose set forth.

2. The combination, with the side ingress and egress platform H, of an omnibus having large side carrying-wheels with short axles, of a caster-wheel, C′, of large diameter, located centrally to support the rear end of the body outside of the platform, substantially as and for the purpose set forth.

3. The combination, in an omnibus, of the carrying side wheels B B mounted upon independently-acting frames C C and provided with springs *s* in housings, with the rear spring caster-wheel support C′ located centrally with the body, substantially as and for the purpose described.

4. The combination, with the top of the body, of the tubular guide-bearing J′ for the caster-wheel, to afford a long and firm bearing to the caster-wheel standard, and a socket for its spring-seat, substantially as set forth.

In testimony whereof I have hereunto set my hand this 1st day of October, A. D. 1874.

MARTIN V. NICHOLS.

Witnesses:

A. E. H. JOHNSON,

J. W. HAMILTON JOHNSON.